US011043822B2

(12) United States Patent
Lau (10) Patent No.: US 11,043,822 B2
(45) Date of Patent: Jun. 22, 2021

(54) APPARATUS FOR JUMP STARTING A VEHICLE

(71) Applicant: BROWN & WATSON INTERNATIONAL PTY LTD, Knoxfield (AU)

(72) Inventor: Andrew L. K. Lau, Templestowe (AU)

(73) Assignee: BROWN & WATSON INTERNATIONAL PTY LTD, Knoxfield (AU)

( * ) Notice: Subject to any disclaimer, the term of this patent is extended or adjusted under 35 U.S.C. 154(b) by 228 days.

(21) Appl. No.: 16/339,658

(22) PCT Filed: Sep. 26, 2017

(86) PCT No.: PCT/AU2017/051046
§ 371 (c)(1),
(2) Date: Apr. 4, 2019

(87) PCT Pub. No.: WO2018/064713
PCT Pub. Date: Apr. 12, 2018

(65) Prior Publication Data
US 2019/0237976 A1 Aug. 1, 2019

(30) Foreign Application Priority Data
Oct. 4, 2016 (AU) .................................. 2016904017

(51) Int. Cl.
*H02J 7/00* (2006.01)
*H02J 7/14* (2006.01)
(Continued)

(52) U.S. Cl.
CPC ......... *H02J 7/0014* (2013.01); *H01M 10/052* (2013.01); *H01M 10/425* (2013.01);
(Continued)

(58) Field of Classification Search
USPC ........................................................ 310/105
See application file for complete search history.

(56) References Cited

U.S. PATENT DOCUMENTS

| 4,540,929 A | 9/1985 | Binkley |
| 5,107,197 A | 4/1992 | Arlinghaus |
| (Continued) | | |

FOREIGN PATENT DOCUMENTS

| GB | 2491051 | 11/2012 |

OTHER PUBLICATIONS

The International Search Report received in the corresponding International Application No. PCT/AU2017/051046, dated Dec. 11, 2017.

(Continued)

*Primary Examiner* — Mohammed Alam
(74) *Attorney, Agent, or Firm* — Kilpatrick Townsend & Stockton (57) ABSTRACT

An apparatus for jump starting a vehicle having a battery and an alternator is disclosed. The apparatus comprises a rechargeable power supply, an isolator electrically connected to said rechargeable power supply and configured for transitioning between a closed position to establish a low impedance electrical path between the rechargeable power supply and the alternator, via the vehicle battery, and an open position to close the electrical connection between the rechargeable power supply and the alternator, a cell voltage sensing and balancing circuit electrically connected to said a rechargeable power supply, and a controller electrically connected to said rechargeable power supply via said cell voltage sensing and balancing circuit, and electrically connected to said isolator, wherein the controller comprises a processor for processing digital data and a memory device coupled to the processor and configured for storing digital (Continued)

data including computer program code, wherein the processor is controlled by the computer program code to: (i) monitor a cell voltage in said rechargeable power supply via the cell voltage sensing and balancing circuit, and if the cell voltage is less than a first predetermined threshold voltage, cause the isolator to transition to the closed position to charge said rechargeable power supply from the alternator, if the cell voltage is greater than the first predetermined threshold voltage, cause the isolator to transition to the open position to close the electrical connection between said rechargeable power supply and the alternator; and (ii) when said rechargeable power supply has sufficient charge, cause the isolator to transition to the closed position to allow an electrical current to flow from said rechargeable power supply to the vehicle battery to jump start the vehicle via said low impedance electrical path.

17 Claims, 8 Drawing Sheets

(51) Int. Cl.
| | |
|---|---|
| *H02J 7/34* | (2006.01) |
| *H01M 10/052* | (2010.01) |
| *H01M 10/42* | (2006.01) |
| *H01M 10/48* | (2006.01) |
| *H02J 7/02* | (2016.01) |
| *H02J 1/10* | (2006.01) |

(52) U.S. Cl.
CPC ........... *H01M 10/48* (2013.01); *H02J 7/0021* (2013.01); *H02J 7/02* (2013.01); *H02J 7/14* (2013.01); *H02J 7/34* (2013.01); *H02J 7/342* (2020.01); *H01M 2010/4271* (2013.01); *H01M 2220/30* (2013.01); *H02J 1/122* (2020.01)

(56) References Cited

U.S. PATENT DOCUMENTS

| | | | |
|---|---|---|---|
| 6,344,733 | B1 | 2/2002 | Crass et al. |
| 2002/0041174 | A1* | 4/2002 | Purkey ................. H02J 7/345 |
| | | | 320/103 |
| 2005/0035741 | A1 | 2/2005 | Elder et al. |
| 2005/0110467 | A1 | 5/2005 | Thomason |
| 2005/0162124 | A1 | 7/2005 | Bertness et al. |
| 2011/0279089 | A1 | 11/2011 | Yeo |
| 2014/0253135 | A1 | 9/2014 | Eguchi et al. |
| 2016/0046199 | A1 | 2/2016 | Butler et al. |
| 2016/0181587 | A1 | 6/2016 | Koebler et al. |
| 2016/0243960 | A1* | 8/2016 | Wood ................... H02J 7/1423 |
| 2019/0237976 | A1* | 8/2019 | Lau ......................... H02J 7/342 |
| 2020/0028368 | A1* | 1/2020 | Nook ................... H02J 7/0016 |
| 2020/0295575 | A1* | 9/2020 | Nook ..................... H02J 1/122 |
| 2020/0317068 | A1* | 10/2020 | Nook ..................... B60L 53/14 |

OTHER PUBLICATIONS

Office Communication received in European Patent Office No. 17897692.2, dated Feb. 19, 2021.

* cited by examiner

APPARATUS FOR JUMP STARTING A VEHICLE

TECHNICAL FIELD

The present invention relates to an apparatus for jump starting a vehicle, and in particular to an apparatus comprising a rechargeable power supply that can be charged by an alternator of the vehicle.

The invention has been developed primarily for use in jump starting vehicles and will be described hereinafter with reference to this application. However, it will be appreciated that the invention is not limited to this particular field of use.

The following discussion of the background to the invention is intended to facilitate an understanding of the invention. However, it should be appreciated that the discussion is not an acknowledgement or admission that any of the material referred to was published, known or part of the common general knowledge in Australia or any other country as at the priority date of any one of the claims of this specification.

BACKGROUND OF INVENTION

The automobile industry is replete with devices used for jump starting a vehicle when the battery of the vehicle has insufficient charge to accomplish this task. Indeed, the simplest means by which to jump start a vehicle with a dead battery is to connect a pair of jump starter cables or jump leads between a fully charged battery of another vehicle to the engine circuit of the vehicle with the dead battery. However, this solution is only possible in situations where other vehicles are in the vicinity.

To address this problem, portable booster devices comprising an internal battery were devised. These portable booster devices can be connected to the vehicle's engine starter via a pair of jump leads to jump start the vehicle.

However, when a booster device has been used to jump start a vehicle it is often the case that the driver forgets to recharge the internal battery of the booster device, such that when the booster device is required again to jump start the same vehicle or the vehicle of a fellow road user, the internal battery has insufficient charge to be able to complete the task. As such, in situations where recharging facilities are not available, invariably means that the driver has to rely on emergency callout services to jump start the vehicle.

The present invention seeks to provide an apparatus for jump starting a vehicle having a battery and an alternator, which will overcome or substantially ameliorate at least some of the deficiencies of the prior art, or to at least provide an alternative.

SUMMARY OF INVENTION

According to a first aspect of the present invention there is provided an apparatus for jump starting a vehicle having a battery and an alternator, comprising:

a rechargeable power supply;

an isolator electrically connected to said rechargeable power supply and configured for transitioning between a closed position to establish a low impedance electrical path between the rechargeable power supply and an alternator of the vehicle, via the vehicle battery, and an open position to close the electrical connection between the rechargeable power supply and the alternator;

a cell voltage sensing and balancing circuit electrically connected to said a rechargeable power supply; and a controller electrically connected to said rechargeable power supply via said cell voltage sensing and balancing circuit, and electrically connected to said isolator, wherein the controller comprises a processor for processing digital data and a memory device coupled to the processor and configured for storing digital data including computer program code, wherein the processor is controlled by the computer program code to:

(i) monitor a cell voltage in said rechargeable power supply via the cell voltage sensing and balancing circuit, and (a) if the cell voltage is less than a first predetermined threshold voltage, cause the isolator to transition to the closed position to charge said rechargeable power supply from the alternator, (b) if the cell voltage is greater than the first predetermined threshold voltage, cause the isolator to transition to the open position to close the electrical connection between said rechargeable power supply and the alternator; and (ii) when said rechargeable power supply has sufficient charge, cause the isolator to transition to the closed position to allow an electrical current to flow from said rechargeable power supply to the vehicle battery to jump start the vehicle via said low impedance electrical path.

Preferably, the rechargeable power supply comprises two or more lithium-based rechargeable cells connected in series, and wherein the processor is further controlled by the computer program code to:

(i) determine, via the cell voltage sensing and balancing circuit, a cell voltage for each of the two or more lithium-based rechargeable cells to identify a lithium-based rechargeable cell having a minimum cell voltage ($V_{min}$) and a lithium-based rechargeable cell having a maximum cell voltage ($V_{max}$), wherein if:

(a) the minimum cell voltage ($V_{min}$) is less than a second predetermined threshold voltage, or (b) the maximum cell voltage ($V_{max}$) is less than a third predetermined threshold voltage, or (c) the difference between the maximum cell voltage ($V_{max}$) and the minimum cell voltage ($V_{min}$) is less than a fourth predetermined threshold voltage, then (A) transmit a signal to a resistor in the cell voltage sensing and balancing circuit to disconnect said resistor from the lithium-based rechargeable cell having the maximum cell voltage ($V_{max}$) to balance the cell voltage across the two or more lithium-based rechargeable cells;

or wherein if:

(a) the minimum cell voltage ($V_{min}$) is greater than the second predetermined threshold voltage, and (b) the maximum cell voltage ($V_{max}$) is greater than the third predetermined threshold voltage, and (c) the difference between the maximum cell voltage ($V_{max}$) and the minimum cell voltage ($V_{min}$) is greater than the fourth predetermined threshold voltage, then (A) transmit a signal to the resistor in the cell voltage sensing and balancing circuit to connect said resistor in parallel to the lithium-based rechargeable cell having the maximum cell voltage ($V_{max}$) to discharge said lithium-based rechargeable cell to balance the cell voltage across the two or more lithium-based rechargeable cells.

Preferably, the rechargeable power supply comprises at least one lithium-based rechargeable cell.

Suitably, the at least one lithium-based rechargeable cell is a lithium-iron phosphate cell selected from the group consisting of $LiFePO_4$, $LiFeMgPO_4$ and $LiFeYPO_4$.

In one embodiment, the rechargeable power supply comprises from one to four lithium-based rechargeable cells connected in series.

Suitably, the first predetermined threshold voltage is 14.6 V.

Suitably, the second predetermined threshold voltage is 2.5 V.

Suitably, the third predetermined threshold voltage is 3.4 V.

Suitably, the fourth predetermined threshold voltage is 0.2 V.

In one embodiment, the isolator comprises a solenoid.

Preferably, the apparatus further comprises a visual indicator electrically connected to the cell voltage sensing and balancing circuit, and configured to display a charge status of said rechargeable power supply.

Preferably, the apparatus further comprises a manual test switch electrically connected to the controller and configured to test a charge status of said rechargeable power supply when said manual test switch is activated.

Preferably, the apparatus further comprises a visual indicator electrically connected to the cell voltage sensing and balancing circuit and configured to display a power ON status of said apparatus.

Preferably, the apparatus further comprises a manual override switch electrically connected to the controller and configured to activate a manual override mode to enable a user to override a predetermined voltage threshold set for protection of the vehicle battery when said manual override switch is activated.

Preferably, the apparatus further comprises a switching circuit electrically connected to each of the controller and the rechargeable power supply and configured to enable the rechargeable power supply to be charged via an AC supply.

According to a second aspect of the present invention there is provided a system for jump starting a vehicle having a battery and an alternator, comprising:

an apparatus according to the first aspect; and a pair of jumpstart cables, each configured at respective ends thereof to electrically connect a corresponding one of a pair of terminals of the apparatus to a corresponding one of a pair of terminals of the vehicle battery so when the isolator is in the closed position, an electrical current is allowed to flow from said rechargeable power supply to the vehicle battery to jump start the vehicle via said low impedance electrical path.

Preferably, the system further comprises an AC charge unit configured for charging the rechargeable power supply via an AC supply.

Other aspects of the invention are also disclosed.

BRIEF DESCRIPTION OF DRAWINGS

Notwithstanding any other forms which may fall within the scope of the present invention, preferred embodiments of the invention will now be described, by way of example only, with reference to the accompanying drawings in which.

DETAILED DESCRIPTION

It should be noted in the following description that like or the same reference numerals in different embodiments denote the same or similar features.

The present invention is predicated on the finding of an apparatus for use in jump starting a vehicle, in which the apparatus comprises a rechargeable power supply consisting of a plurality of rechargeable lithium-based cells. Each of the cells is capable of accepting a high charge current, which means that the rechargeable power supply can be fully recharged by an alternator of the vehicle in a matter of mere minutes.

System

Figure 10:
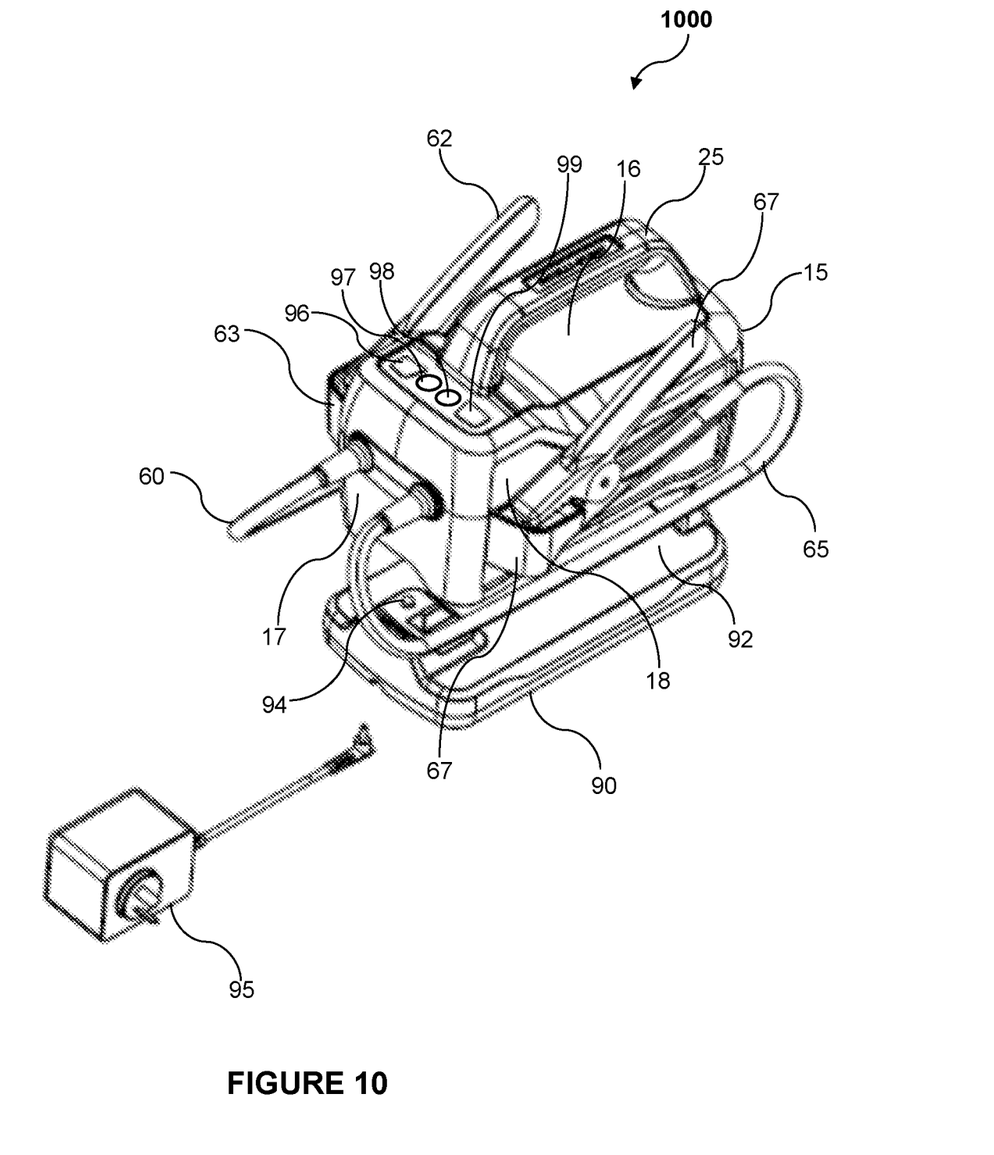
FIG. 10 shows a perspective view of a system including an apparatus for jump starting a vehicle according to a preferred embodiment of the present invention.

FIG. 10 shows a perspective view of a system 1000 for use in jump starting a vehicle (not shown) according to a preferred embodiment of the present invention.

The system 1000 comprises an apparatus 10 configured to be connected in parallel with an alternator 500 of the vehicle to establish a low impedance electrical path for use in recharging a rechargeable power supply 20 of the apparatus 10.

Specifically, the apparatus 10 comprises a housing 15 having a handle 25 located at an upper portion 16 of the housing 15, and a pair of jumpstart leads or cables 60, 65 extending outwardly from a front face portion 17 of the housing 15.

Each jumpstart cable 60, 65 comprises at a terminal end thereof a clamp 62, 67 for use in coupling the jumpstart cables 60, 65 to the corresponding positive or negative terminal (not shown) of a starter battery 510 of the vehicle in use. It will be appreciated that the jumpstart cables 60, 65 will be of sufficient capacity to withstand the large currents associated with an electrical connection to an alternator.

The housing 15 of the apparatus 10 further comprises two brackets 63, 67 located at opposing side portions (of which only side portion 18 is visible) of the housing 15. The brackets 63, 67 are adapted to receive and mount a corresponding one of the two clamps 62, 66 thereat for storage purposes when not coupled to the terminals of the starter battery 510.

At the other end, the jumpstart cables 60, 65 are electrically connected to a corresponding positive or negative terminal within the housing 15 of the apparatus 10, and will be described below in more detail with reference to FIG. 1.

Figure 1:
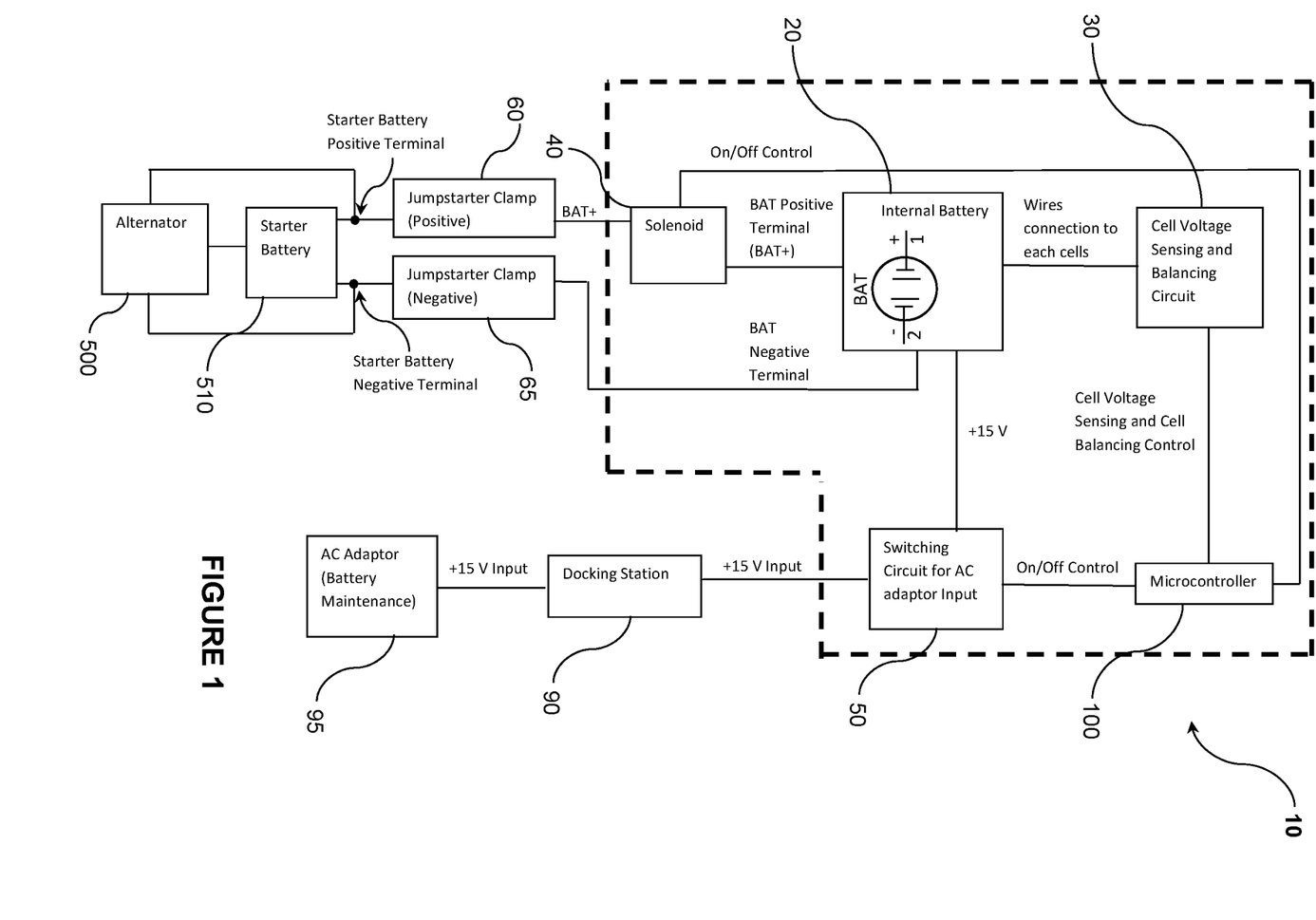
FIG. 1 shows a schematic representation of a set of internal components of an apparatus for jump starting a vehicle according to a preferred embodiment of the present invention.

FIG. 1 shows a schematic representation of a set of components contained within the housing 15 of the apparatus 10 (indicated in dashed outline).

The main components of the apparatus 10 include a rechargeable power supply 20 having positive and negative terminals, an isolator 40 electrically connected to the positive terminal of said rechargeable power supply 20, a cell voltage sensing and balancing circuit 30, and a controller 100 electrically connected to the isolator 40 and electrically connected to the rechargeable power supply 20 via the cell voltage sensing and balancing circuit 30.

Rechargeable Power Supply

The rechargeable power supply 20 of the apparatus 10 comprises one or more lithium-based rechargeable cells connected in series. The number of cells is largely determined by the capacity of the cells to achieve the high demands required to jump start a vehicle.

In the preferred form, the rechargeable power supply 20 comprises four (4) lithium-iron phosphate cells connected in series.

Lithium-iron phosphate cells have higher current or peak-power ratings and lower energy densities than the more common $LiCoO_2$ cells. Lithium-iron phosphate cells also offer longer lifetimes and have a constant discharge voltage that stays close to the nominal output voltage (3.2V) associated with the cell during discharge until the cell is exhausted. This allows lithium-iron phosphate cells to deliver virtually full power until they are discharged.

A variety of lithium-iron phosphate cell are commercially available including but not limited to $LiFePO_4$, $LiFeMgPO_4$ and $LiFeYPO_4$ based cells. The inventors have achieved good results using lithium-iron phosphate cells of the $LiFePO_4$ type.

Isolator

The isolator 40 of the apparatus 10 is provided in the form of an electromechanical solenoid which is configured for transitioning between a closed position to establish a low impedance electrical path between the rechargeable power supply 20 and the alternator 500 of the vehicle (via the starter battery 510), and an open position to close the electrical connection. The transitioning of the solenoid 40 between the open and closed positions is triggered in response to receiving an electric current, the flow of which to the solenoid 40 is controlled by the controller 100.

General Purpose Controller

Figure 2:
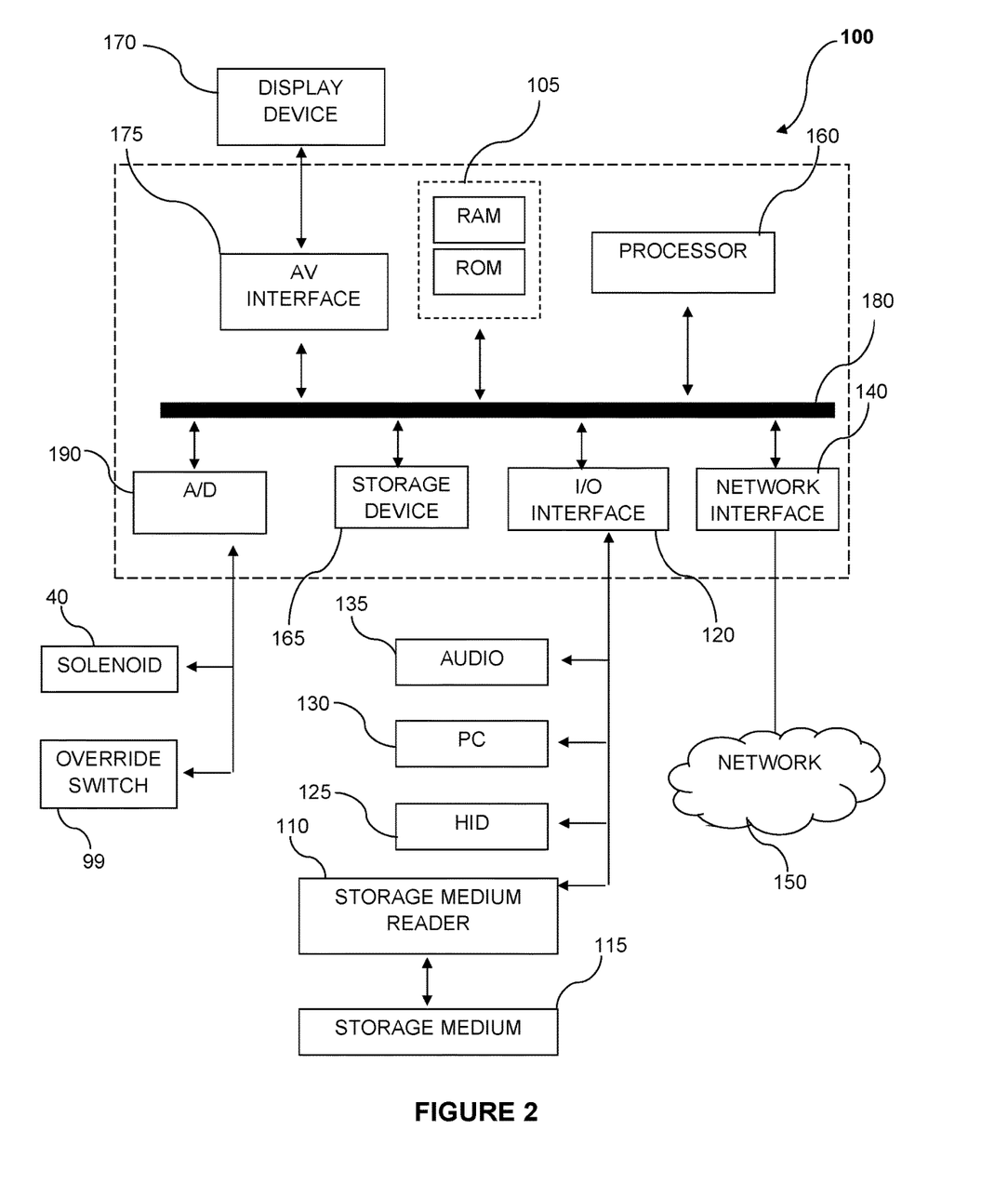
FIG. 2 shows a general purpose controller on which the various embodiments described herein may be implemented.

FIG. 2 shows a general purpose controller 100 on which the various embodiments described herein may be implemented.

The controller 100 comprises a memory device for storing digital data including computer program code. The memory device is provided in the form of semiconductor memory 105 comprising volatile memory such as random access memory (RAM) or read only memory (ROM). The memory 105 may comprise either RAM or ROM or a combination of RAM and ROM. Typically, the memory device 105 comprises a combination of volatile and non-volatile memory, such that the non-volatile memory stores the controller 100 firmware and the volatile memory stores one or more temporary results of the fetch-decode-execute cycle, as described below.

The controller 100 comprises a computer program code storage medium reader 1030 for reading the computer program code instructions from computer program code storage media 115. The storage media 115 may be optical media such as CD-ROM disks, magnetic media such as floppy disks and tape cassettes or flash media such as USB memory sticks.

The controller 100 further comprises an I/O interface 120 for communicating with one or more peripheral devices. The I/O interface 120 may offer both serial and parallel interface connectivity. For example, the I/O interface 120 may comprise a Small Computer System Interface (SCSI), Universal Serial Bus (USB) or similar I/O interface for interfacing with the storage medium reader 110. The I/O interface 120 may also communicate with one or more human input devices (HID) 125 such as a keyboard or pointing devices. The I/O interface 120 may also communicate with one or more personal computing (PC) devices 130, using, for example, a suitable interface such as a Recommended Standard 232 (RS-232) interface. The I/O interface 120 may also comprise a separate audio interface for communicate audio signals to one or more audio devices 135, such as a speaker or a buzzer.

The controller 100 also comprises a network interface 140 for communicating with one or more computer networks 1080. The network 150 may be a wired network, such as a wired Ethernet™ network or a wireless network, such as a Bluetooth™ network or IEEE 802.11 network. The network 150 may be a local area network (LAN), such as a home or office computer network, or a wide area network (WAN), such as the Internet or private WAN.

The controller 100 comprises an arithmetic logic unit or processor 160 that is coupled to the semiconductor memory 105, and is configured for performing the computer program code instructions and processing the digital data. The processor 160 may be a reduced instruction set computer (RISC) or complex instruction set computer (CISC) processor or the like.

The controller 100 further comprises a storage device 165, such as a magnetic disk hard drive or a solid state disk drive. The processor 160 is typically a low-power microprocessor suited to low power embedded controller applications.

Computer program code instructions may be loaded into the storage device 165 from the storage media 115 using the storage medium reader 110 or from the network 150 using the data network interface 140. During the bootstrap phase, an operating system and one or more software applications are loaded from the storage device 165 into the memory 105. During the fetch-decode-execute cycle, the processor 160 fetches computer program code instructions from memory 105, decodes the instructions into machine code, executes the instructions and stores one or more intermediate results in memory 105.

The controller 100 also comprises a video interface 175 for conveying video signals to a display device 170, such as a liquid crystal display (LCD), cathode-ray tube (CRT), an LED display or similar display device. Such a display panel may be embedded in the controller 100, or located remotely.

The controller 100 also comprises a communication bus subsystem 180 for interconnecting the various devices described above. The bus subsystem 180 may offer parallel connectivity such as Industry Standard Architecture (ISA), conventional Peripheral Component Interconnect (PCI) and the like or serial connectivity such as PCI Express (PCIe), Serial Advanced Technology Attachment (Serial ATA) and the like.

The controller 100 further comprises an analog to digital (A/D) converter 190 for converting analog signals received from, for example, the solenoid 40, into a digital format.

Cell Voltage Sensing and Balancing Circuit

Figure 5:
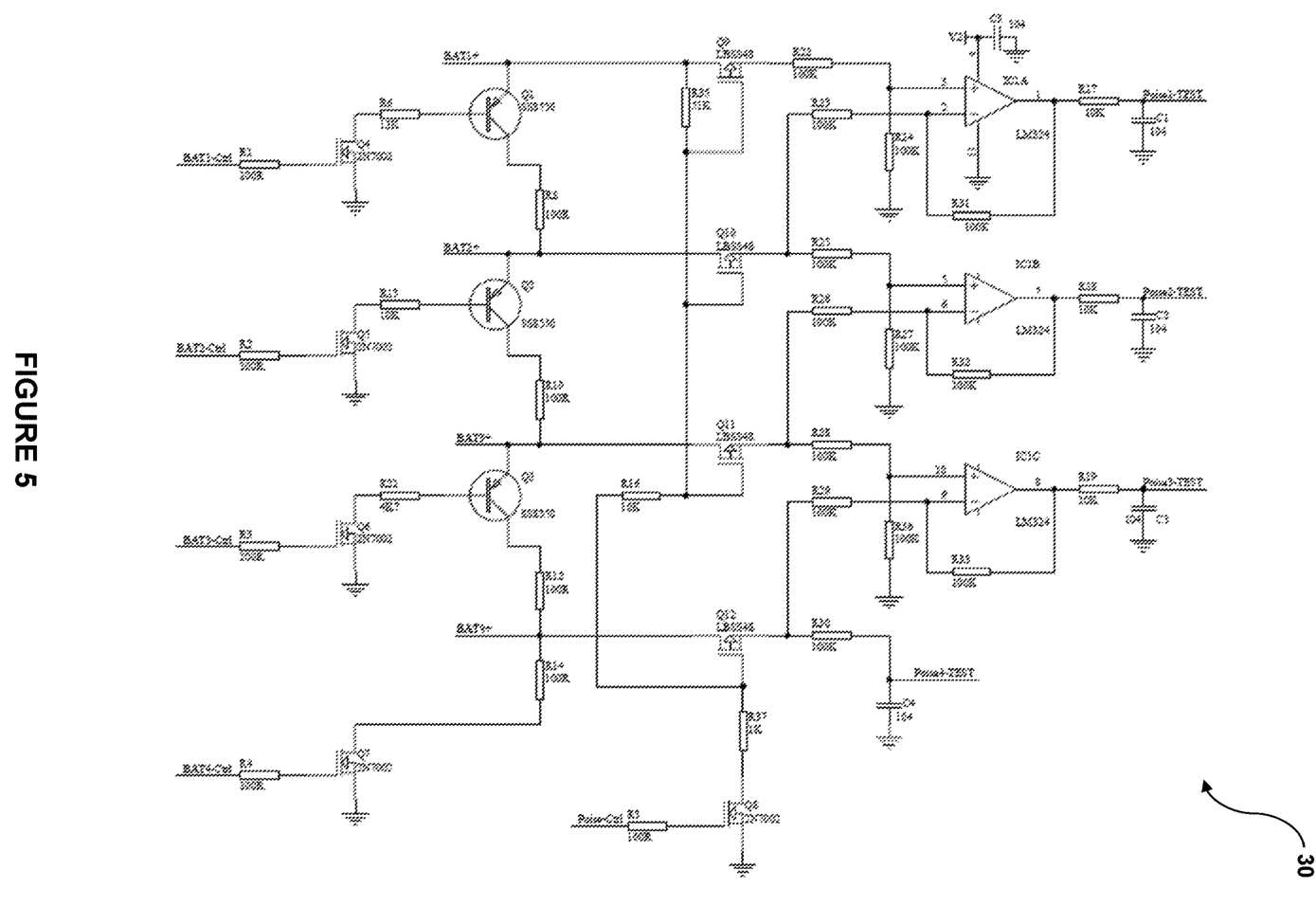
FIG. 5 shows a schematic layout of a cell voltage sensing and balancing circuit for use in sensing and balancing cell voltages across four rechargeable cells (BAT1, BAT2, BAT3, BAT4) connected in series in a rechargeable power supply of the apparatus of FIG. 1.

FIG. 5 shows a general layout of the cell voltage sensing and balancing circuit 30 employed in the apparatus 10.

The cell voltage sensing and balancing circuit 30 comprises essentially of circuitry that senses and balances the cell voltages across four (4) lithium-based rechargeable cells (labelled: BAT1, BAT2, BAT3, BAT4) all connected in series.

Voltage Sensing

Figure 8:
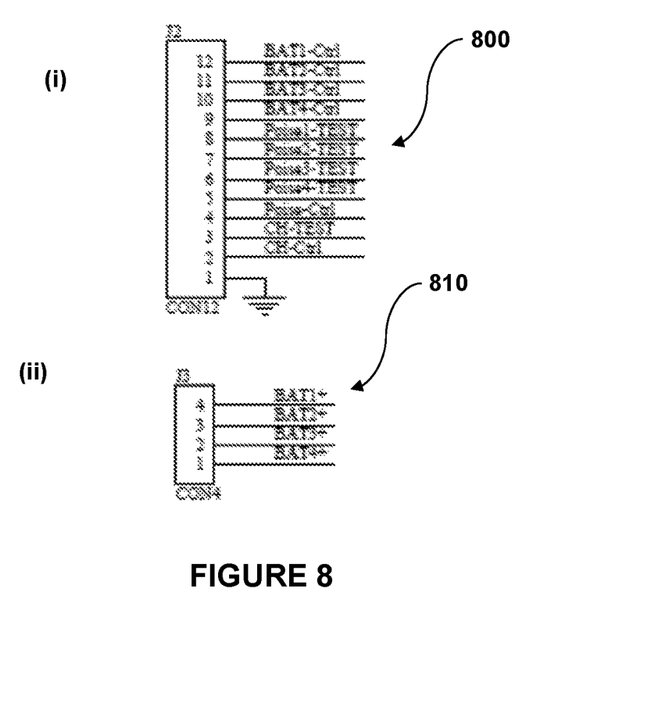
FIG. 8 shows schematic representations of (i) a connector configured to electrically connect each of a plurality of control and testing points in the cell voltage sensing and balancing circuit of FIG. 5 to a processor of the apparatus of FIG. 1, and (ii) a connector configured to electrically connect each of the four rechargeable cells (BAT1, BAT2, BAT3, BAT4) to the cell voltage sensing and balancing circuit of FIG. 5.

Firstly, each of the four rechargeable cells (BAT1, BAT2, BAT3 and BAT4) is electrically connected to the cell voltage sensing and balancing circuit 30 via a connector 810, shown schematically in FIG. 8 (ii).

The cell voltage for each of BAT1, BAT2, BAT3 and BAT4 can be sensed or measured using voltage sensor circuitry comprising of the following components.

Resistors, R22, R23, R24 and R31, and operational amplifier, IC1A, together form a unity gain differential amplifier as a buffer stage to sense the cell voltage of BAT1. Similarly, resistors, R25, R26, R27 and R32, and operational amplifier, IC1B, together form a unity gain differential amplifier as a buffer stage to sense the cell voltage of BAT2. Again, resistors, R28, R29, R36 and R33, and operational amplifier, IC1C, together form a unity gain differential amplifier as a buffer stage to sense the cell voltage of BAT3. Power to each of IC1A, IC1B and IC1C is provide via a sensing point, labelled as V2 in FIG. 5.

The cell voltage for BAT4 can simply be measured at the output, BAT4+.

Specifically, and with reference to FIGS. 5 and 8(*i*), when sensing or measuring the cell voltages across the four cells, the processor 160 is controlled by the computer program code to transmit a signal to transmit a logic high signal to Poise-Ctrl pin to cause the MOSFET at Q8 to be switched on. This causes each of the MOSFETs at Q9, Q10, Q11 and Q12 to be switched on resulting in the corresponding positive terminal of each cell (namely, BAT1+, BAT2+, BAT3+ and BAT4+) to be connected to the corresponding resistor (R22, R25, R28 and R30, respectively).

Once connected, the processor 160 is then able to sense the input voltage associated with each of BAT1, BAT2, BAT3 and BAT4 at a corresponding test point (labelled: Poise1-TEST, Poise2-TEST, Poise3-TEST and Poise4-TEST, respectively).

Test points, Poise1-TEST, Poise2-TEST, Poise3-TEST and Poise4-TEST, are electrically connected to the processor 160 via a connector 800, shown schematically in FIG. 8(*i*).

The overall cell voltage of the rechargeable power supply 20 can be determined via sensing point V2 or by the cell voltage as determined at the positive terminal BAT1+.

Cell Balancing

Once the cell voltage for each of BAT1, BAT2, BAT3 and BAT4 has been determined, the difference in cell voltage between each of the following pairings, (BAT1 and BAT2), (BAT2 and BAT3), (BAT3 and BAT4) is then compared to identify the cell with the minimum voltage ($V_{min}$) and the cell with the maximum voltage ($V_{max}$) The ($V_{min}$) and ($V_{max}$) values are then used to balance the overall cell voltage across the four cells.

Specifically, when the processor 160 detects that BAT1 has $V_{max}$, the processor 160 sends a logic high signal to BAT4-Ctrl pin. This signal causes the metal-oxide semiconductor field effect transistor (MOSFET) at Q7 to be switched on, which in turn, causes the resistor R14 to be, in effect, connected in parallel to BAT4 to discharge BAT4. Similarly, when the processor 160 detects that BAT3 has $V_{max}$, it sends a logic high signal to BAT3-Ctrl pin. This signal causes the MOSFETs at Q6 and Q3 to be turned on, which in turn, causes the resistor, R12, to be, in effect, connected in parallel to BAT3 to discharge BAT3. Similarly, when the processor 160 detects that BAT2 has $V_{max}$, it sends a logic high signal to BAT2-Ctrl pin. This signal causes the MOSFETs at Q5 and Q2 to be turned on, which in turn, causes the resistor, R10, to be connected in parallel to BAT2 to discharge BAT2. Lastly, when the processor 160 detects BAT1 has $V_{max}$, it sends a logic high signal to BAT1-Ctrl pin, which causes the MOSFETs at Q4 and Q1 to be switched on, which in turn, causes the resistor, R18, to be, in effect, connected in parallel to BAT1 to discharge BAT1.

By virtue of this arrangement, it is possible to selectively discharge a cell if the cell voltage of that cell is greater or less than a predetermined voltage threshold.

Recharging Method

Figure 3:
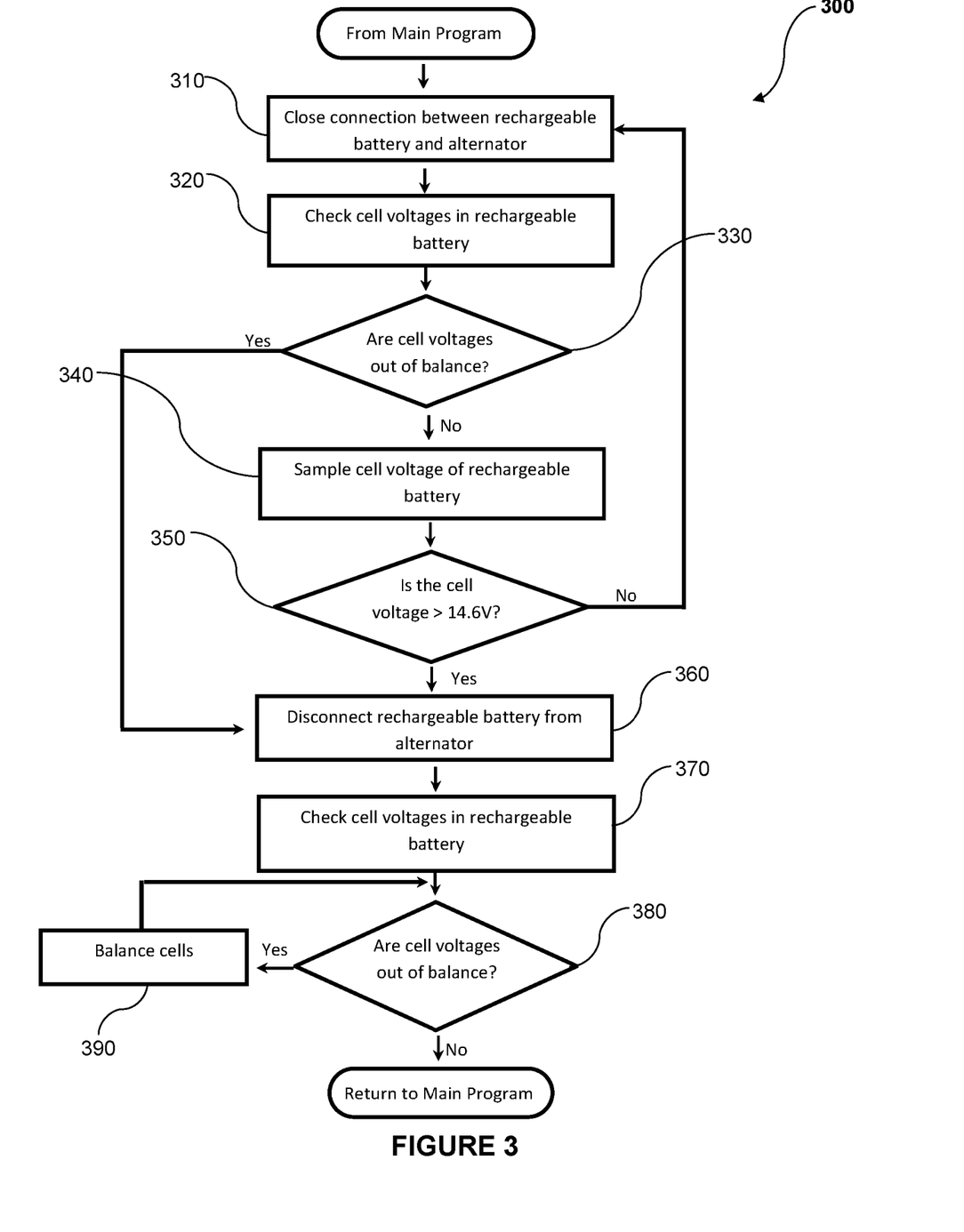
FIG. 3 shows a flowchart outlining steps of a method for determining an overall cell voltage across four rechargeable cells (BAT1, BAT2, BAT3, BAT4) connected in series of a rechargeable power supply of the apparatus of FIG. 1 during a charging process.

FIG. 3 shows a flowchart outlining the steps of a general method 300 for recharging the rechargeable power supply 20 of the apparatus 10 by the alternator 500 of a vehicle via the low impedance electrical path shown in FIG. 1.

Specifically, the method 300, which may be implemented as computer program code instructions executable by the controller 100, provides the various steps used to measure the cell voltages of the individual cells of the rechargeable power supply 20, via the cell voltage sensing and balancing circuit 30 (shown in FIG. 5) throughout the recharging process.

According to a first step 310 of the method 300, the processor 160 is controlled by the computer program code to transmit a signal to the solenoid 40 to cause the solenoid 40 to transition to the closed position so as to establish an electrical connection between the rechargeable power supply 20 and the alternator 500 of the vehicle.

According to a second step 320, the cell voltage of each of the four (4) lithium-based rechargeable cells (labelled: BAT1, BAT2, BAT3, BAT4) of the rechargeable power supply 20 is then measured and compared to determine if the individual cell voltages are out of balance.

If, at step 330, the individual cell voltages are not out of balance, then the method 300 proceeds automatically to step 340, the process of which is described below.

If, at step 330, the individual cell voltages are out of balance, then the method 300 proceeds directly to step 360, the process of which is described below.

At step 340, the cell voltage of the rechargeable power supply 20 is measured, and at step 350, queried to determine if the measured cell voltage is greater than a predetermined threshold voltage. Here, the predetermined threshold voltage is determined by the type of starter battery 510 employed. For most vehicles, the starter battery 510 is a 12V lead-acid battery which requires a minimum charging voltage of 13.8V to initiate the charging process. Typical charging voltages range between 14.2V and 14.5V for realising an effective charge over a reasonable timeframe. However, a charging voltage above 14.5V means that there is an increased tendency for the electrolyte in the battery to evaporate thereby releasing potentially explosive hydrogen gas and strongly corrosive acidic vapours. In this respect, the charging voltage for a 12V lead-acid battery must not exceed 14.7V. As shown in step 350, the predetermined threshold voltage has been set to a maximum charging voltage of 14.6V.

If, at step 350, the cell voltage of the rechargeable power supply 20 is greater than 14.6V, then the method 300 proceeds automatically to step 360, the process of which is described below.

On the other hand, if, at step 350, the cell voltage of the rechargeable power supply 20 is not greater than 14.6V, then the method 300 proceeds directly to step 310.

At step 360, the processor 160 is controlled by the computer program code to transmit a signal to the solenoid 40 to cause the solenoid 40 to transition to the open position so as to close the electrical connection between the rechargeable power supply 20 and the alternator 500 of the vehicle, thereby ceasing the recharging process.

Figure 4:
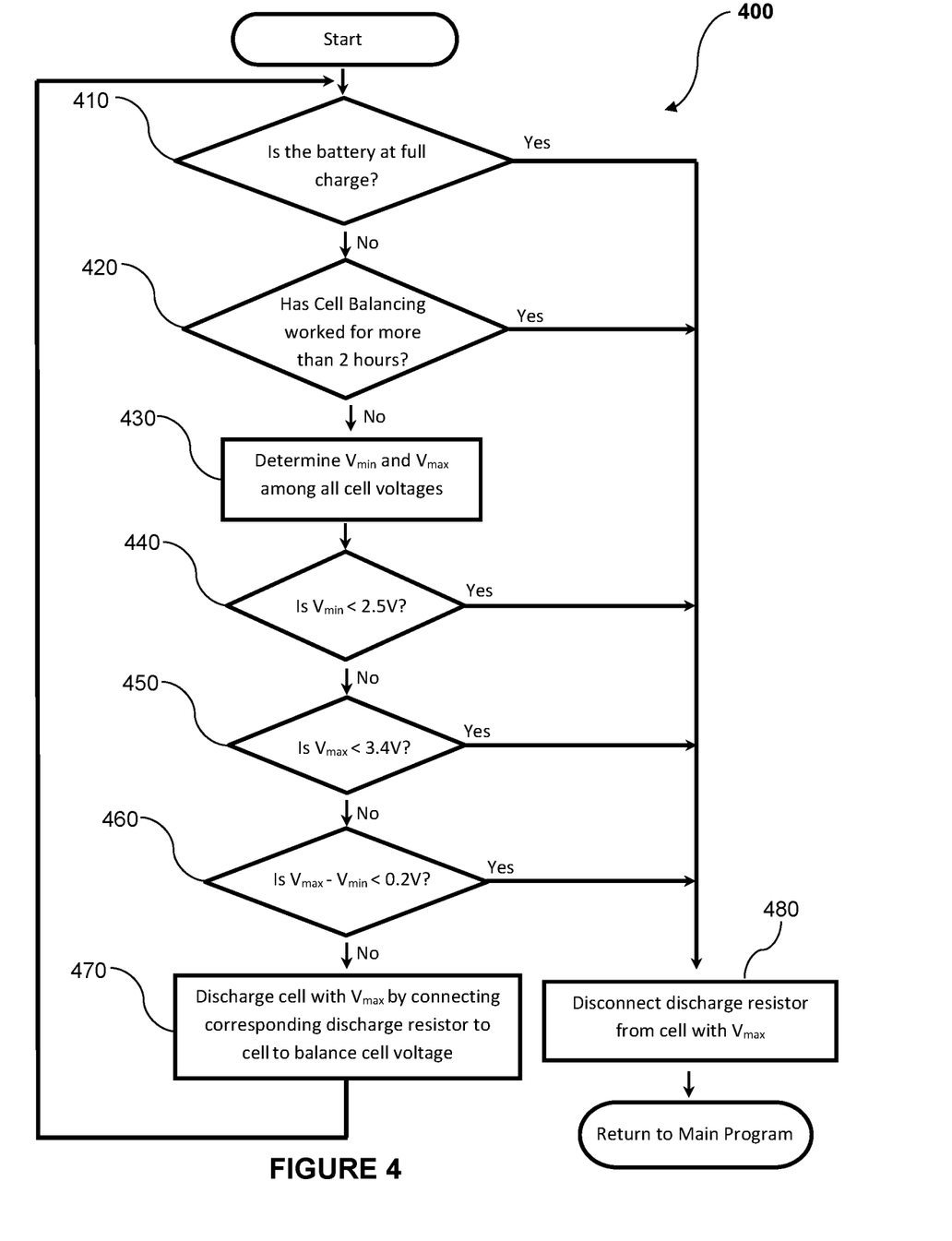
FIG. 4 shows a flowchart outlining steps of a method for sensing and balancing cell voltages across four rechargeable cells (BAT1, BAT2, BAT3, BAT4) connected in series in a rechargeable power supply of the apparatus of FIG. 1.

At steps 370 and 380, the cell voltage of each of BAT1, BAT2, BAT3 and BAT4 is measured and compared again with each other to determine if the individual cell voltages are still out of balance. If this is still the case, the method 300 proceeds automatically to step 390 to balance the individual cell voltages. The various steps associated with balancing the individual cell voltages of BAT1, BAT2, BAT3 and BAT4 are described in a separate method 400, as shown in FIG. 4.

If at step 380 of the method 300, the individual cell voltages of BAT1, BAT2, BAT3 and BAT4 are balanced, then the processor 160 is controlled by the computer program code to exit the cell balancing routine and return to the main program, whereby power to the apparatus 10 is switched off so as to conserve energy.

Thus, once the rechargeable power supply 20 has been fully recharged, and the cell voltages across the individual cells of the rechargeable power supply 20 are balanced, the apparatus 10 can be used to jumpstart the starter battery 510 via the low impedance electrical path established therebetween.

Cell Balancing Method

FIG. 4 shows a flowchart outlining the steps of a method 400 for balancing the cell voltages of the individual cells of the rechargeable power supply 20, which may be triggered by step 390 of the method 300 described above.

Specifically, the method 400, which may be implemented as computer program code instructions executable by the controller 100, provides the various steps used to balance the cell voltages of the individual rechargeable cells (BAT1, BAT2, BAT3 and BAT4) of the rechargeable power supply 20, via the cell voltage sensing and balancing circuit 30 (shown in FIG. 5).

According to a first step 410 of the method 400, the processor 160 is controlled by the computer program code to determine, via the cell voltage sensing and balancing circuit 30 (shown in FIG. 5), whether the rechargeable power supply 20 of the apparatus 10 is being charged or is at full charge.

Specifically, the cell voltage of the rechargeable power supply 20 is measured twice within the space of 30 seconds, and if the cell voltage is found to increase by 0.1V, then the processor 160 is controlled by the computer program code to regard the rechargeable power supply 20 as in the process of being charged. If the lowest cell voltage among the four rechargeable cells (BAT1, BAT2, BAT3 and BAT4) of the rechargeable power supply 20 reaches 3.6V and the voltage of rechargeable power supply 20 reaches 14.6V, then the processor 160 is controlled by the computer program code to regard the rechargeable power supply 20 as being fully charged.

If the rechargeable power supply 20 of the apparatus 10i is at full charge, then the method 400 automatically proceeds to step 480, the process of which is described below.

If the rechargeable power supply 20 of the apparatus 10 is not fully charged, then the method 400 proceeds automatically to step 420, where the processor 160 is controlled by the computer program code to determine if the cell balancing method 400 has been working for more than a predetermined amount of time. Here, the predetermined amount of time is set at two hours. Although, it will be appreciated by those skilled in the relevant art that a greater or shorter amount of time may be employed as the predetermined amount of time.

If the predetermined time is greater than two hours, then the method 400 automatically proceeds to step 480, the process of which is described below.

If the predetermined time is not greater than two hours, then the method 400 proceeds automatically to step 430, where the processor 160 is controlled by the computer program code to determine, via the cell voltage sensing and balancing circuit 30, a cell voltage for each of the four rechargeable cells (BAT1, BAT2, BAT3 and BAT4) to identify the cell having the minimum cell voltage ($V_{min}$) and the cell having the maximum cell voltage ($V_{max}$), among the four cells.

Once the minimum cell voltage ($V_{min}$) and the maximum cell voltage ($V_{max}$) have been determined, then according to step 440, the processor 160 is controlled by the computer program code to determine if the minimum cell voltage ($V_{min}$) is less than a second predetermined threshold voltage. Here, the second predetermined threshold voltage is 2.5V.

If the minimum cell voltage ($V_{min}$) is less than the second predetermined threshold voltage (2.5V), then the processor 160 is controlled by the computer program code to regard the cell voltages across the four cells as being below the minimum cell voltage specified for the rechargeable power supply 20 by, for example, the battery manufacturer, and terminate the cell balancing activity and the method 400 automatically proceeds to step 480, the process of which is described below.

If the minimum cell voltage ($V_{min}$) is greater than the second predetermined threshold voltage (2.5V), then the method 400 proceeds to step 450, where the processor 160 is controlled by the computer program code to determine if the maximum cell voltage ($V_{max}$) is less than a third predetermined threshold voltage. Here, the third predetermined threshold voltage is 3.4V.

If the maximum cell voltage ($V_{max}$) is less than the third predetermined threshold voltage (3.4V), then the processor 160 is controlled by the computer program code to regard the cell voltages across the four cells as being too low to require balancing and the method 400 proceeds automatically to step 480, the process of which is described below.

If the maximum cell voltage ($V_{max}$) is greater than the third predetermined threshold voltage (3.4V), then the method 400 proceeds to step 460, where the processor 160 is controlled by the computer program code to determine if the difference between the maximum cell voltage ($V_{max}$) and the minimum cell voltage ($V_{min}$) is less than a fourth predetermined threshold voltage. Here, the fourth predetermined threshold voltage is 0.2V.

If the difference between the maximum cell voltage ($V_{max}$) and the minimum cell voltage ($V_{min}$) is less than the fourth predetermined threshold voltage (0.2V), then the processor 160 is controlled by the computer program code to regard the cell voltages across the four cells as being balanced and the method 400 automatically proceeds to step 480, the process of which is described below.

If the difference between the maximum cell voltage ($V_{max}$) and the minimum cell voltage ($V_{min}$) is not less than the fourth predetermined threshold voltage (0.2V), then the method proceeds automatically to step 470, the process of which is described below.

According to step 470, the processor 160 is controlled by the computer program code to transmit a signal to the discharge resistor associated with the rechargeable cell having the maximum cell voltage ($V_{max}$) to connect the discharge resistor in parallel to the lithium-based rechargeable cell so as to discharge the rechargeable cell having the maximum cell voltage ($V_{max}$) and thereby balance the cell voltages across the four rechargeable cells (BAT1, BAT2, BAT3 and BAT4).

According to step 480, the processor 160 is controlled by the computer program code to transmit a signal to the discharge resistor associated with the rechargeable cell having the maximum cell voltage ($V_{max}$) to disconnect the discharge resistor from this rechargeable cell to balance the cell voltage across the four rechargeable cells (BAT1, BAT2, BAT3 and BAT4).

Once the cell voltages across all four rechargeable cells have been balanced, the cell balancing method 400 is considered to be complete, enabling the processor 160 to exit the process.

As described above, the discharge resistors associated with each of the four rechargeable cells (BAT1, BAT2, BAT3 and BAT4) shown in the cell voltage sensing and balancing circuit 30 in FIG. 5 are 100R resistors labelled as R8, R10, R12 and R14, respectively.

Additional Components

It will be appreciated by persons of ordinary skill in the relevant art that the apparatus 10 is not limited to the components described, but that other components or features may be incorporated within the apparatus 10.

For instance, and as shown in FIG. 10, the apparatus 10 also comprises a visual indicator 98 electrically connected to the cell voltage sensing and balancing circuit 30, and configured to display a charge status of said rechargeable power supply 20. Ideally, the visual indicator 98 takes the form of a light emitting diode (LED) that is suitably positioned at the upper portion 16 of the housing 15 of the apparatus 10 so as to ensure a good line of sight for a user. As such, once a full charge has been established, the processor 160 is controlled by the computer program code to transmit a signal to the visual indicator 98 causing it to illuminate so as to alert a user that the recharge process has been completed.

The apparatus 10 also comprises a manual test switch 96 electrically connected to the controller 100 and configured to test a charge status of said rechargeable power supply 20 when said manual test switch 96 is activated.

The apparatus 10 also comprises another visual indicator 97 electrically connected to the cell voltage sensing and balancing circuit 30 and configured to display a power ON status of said apparatus 10. Again, the visual indicator 97 ideally takes the form of a light emitting diode (LED) that is suitably positioned at the upper portion 16 of the housing 15 of the apparatus 10 so as to ensure a good line of sight for a user.

In one embodiment, the apparatus 10 further comprises a manual override switch 99 electrically connected to the controller 100 and configured to activate a manual override mode to enable a user to override a predetermined voltage threshold that has been set for protection of the starter battery 510. For instance, if the starter battery 510 has a voltage above a predetermined voltage threshold of 3V, the processor 160 is controlled by the computer program code to cause the solenoid 40 to transition to the closed position automatically so as to establish a low impedance electrical path between the alternator 500 and the rechargeable power supply 20 to enable the recharging of the rechargeable power supply 20. If, on the other hand, the voltage of the starter battery 510 falls below the 3V threshold, rather than the processor 160 being controlled by the computer program code to cause the solenoid 40 to transition to the open position so as to close the electrical connection between the alternator 500 and the rechargeable power supply 20, a user can simply override this pre-programmed action by activating the manual override switch 99 to cause the solenoid 40 to transition to the closed position.

Docking Station

As shown in FIG. 10, the system 1000 further comprises an optional docking station 90 suitably configured for seating the apparatus 10 thereon for the purpose of recharging the rechargeable power supply 20 of the apparatus 10 via an external AC mains supply.

Figure 7:
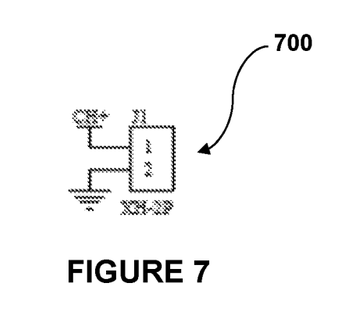
FIG. 7 shows schematic representation of a connector for linking the switching circuit of FIG. 6 to a power input of the docking station.

FIG. 7 shows a connector 700 for use in electrically connecting the switching circuit 50 to a power input (not shown) of the docking station 90.

The docking station 90 is configured to be electrically connected to an AC mains supply by virtue of an AC charger unit or adaptor 95. The docking station 90 comprises a pair of charging pins (of which only charging pin 94 is visible in FIG. 10) located in a seat portion 92 of the docking station 90.

In other embodiments, it will be appreciated that the apparatus 10 may be configured to enable the AC charger unit 95 to be electrically connected directly to the rechargeable power supply 20 to recharge the rechargeable power supply 20 from the AC mains supply without the need for the docking station 90.

Switching Circuit

Figure 6:
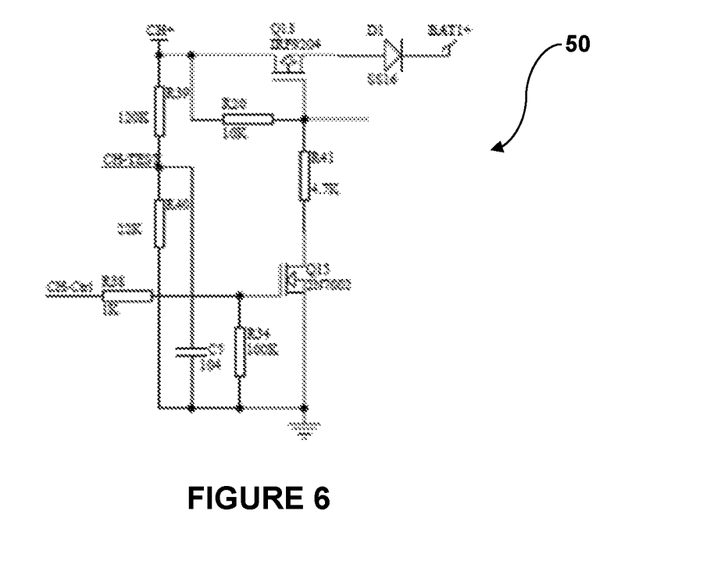
FIG. 6 shows a schematic layout of a switching circuit for use in electrically connecting the apparatus of FIG. 1 to a docking station (not shown) for use in charging a rechargeable power supply of the apparatus from an AC supply.

As shown in FIGS. 1 and 6, the apparatus 10 further comprises a switching circuit 50 electrically connected to each of the controller 100 and the rechargeable power supply 20. The switching circuit 50 is configured to enable the rechargeable power supply 20 to be charged via the external AC mains supply.

Thus, when the apparatus 10 is seated on the seat portion of the docking station 90, each of the charging pins 94 engages with a corresponding one of a pair of terminals (not shown) located at an underside portion (not shown) of the housing 15 of the apparatus 10. These positive and negative terminals of the apparatus 10 are electrically connected to the switching circuit 50 located within the housing 15 of the apparatus 10. Once an electrical connection is established between the charging pins 94 and the two terminals, the controller 100 transmits a signal to the switching circuit 50 to establish an electrical connection to the rechargeable power supply 20 to initiate recharging thereof.

Once a full charge has been established, the processor 160 is controlled by the computer program code to transmit a signal to the switching circuit 50 to disconnect the electrical connection between the rechargeable power supply 20 and the external AC supply, to cease the recharging process.

At the same time, the processor 160 is controlled by the computer program code to transmit a signal to the visual indicator 98 causing it to illuminate so as to alert a user that the recharge process has been completed.

Figure 9:
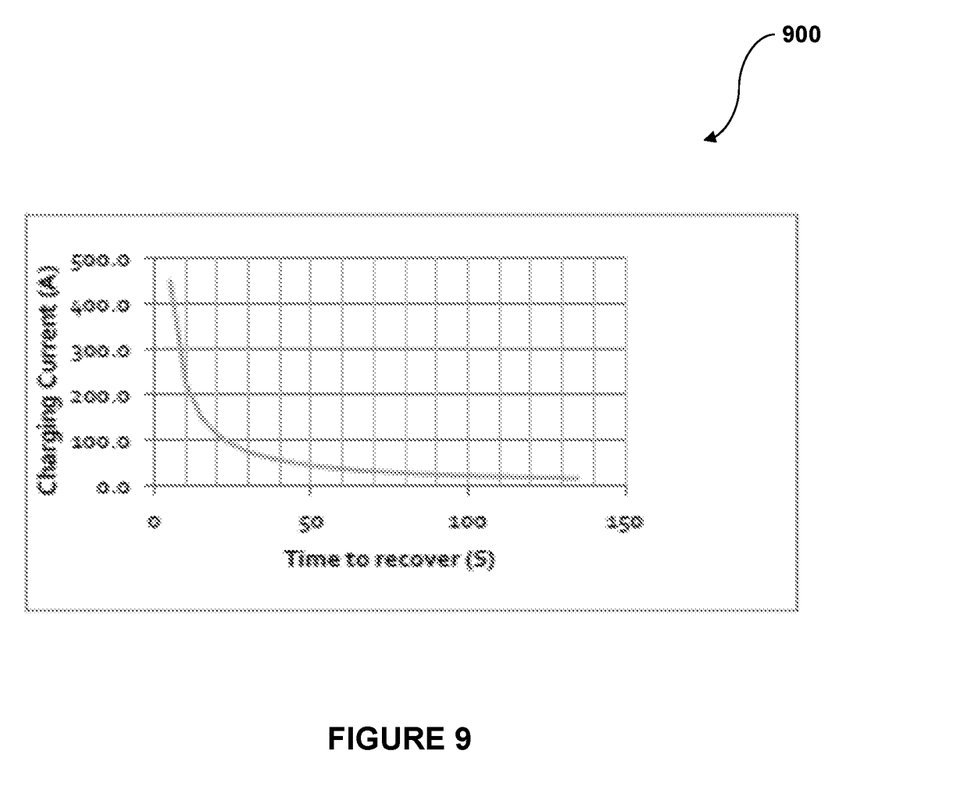
FIG. 9 shows a plot of charging current (A) versus recovery time (s) for recharging a plurality of rechargeable cells connected in series in the rechargeable power supply of the apparatus of FIG. 1 from an alternator of a vehicle.

FIG. 9 shows a plot of charging current (A) versus recovery time (s) for recharging a plurality of four rechargeable lithium-based cells (BAT1, BAT2, BAT3 and BAT4) connected in series in the rechargeable power supply 20 of the apparatus 10 using a 100A alternator 500, via the low impedance electrical path described above.

The plot demonstrates that after using the apparatus 10 to perform a single 450A/55 jumpstart of a vehicle, it is possible to recover the energy lost as a result of the jumpstart by recharging the rechargeable power supply 20 using the 100 A alternator 500 in as little as just 22.5 seconds.

Advantages

The system 1000 and apparatus 10 according to the preferred embodiments of the present invention provides at least the following advantage.

The internal rechargeable power supply of the apparatus 10 can be recharged directly using the alternator 510 of a vehicle, via a low impedance electrical path.

knowing that the rechargeable power supply 20 of the apparatus 10 can be fully recharged in only a mere matter of minutes, a driver will be more likely to recharge the rechargeable power supply 20 immediately after a jumpstart has been performed, rather than simply disconnecting the apparatus 10 from the starter battery 510 and driving off, thereby running the risk of having an apparatus 10 with insufficient charge to perform another jumpstart.

The internal rechargeable power supply of the apparatus 10 can also be recharged via an AC mains supply by virtue of a docking station 90 and AC adaptor 95.

The apparatus 10 is lightweight and portable.

Definitions

All definitions, as defined and used herein, should be understood to control over dictionary definitions, definitions in documents incorporated by reference, and/or ordinary meanings of the defined terms.

The indefinite articles "a" and "an," as used herein in the specification, unless clearly indicated to the contrary, should be understood to mean "at least one."

The phrase "and/or," as used herein in the specification, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

While the invention has been described in conjunction with a limited number of embodiments, it will be appreciated by those skilled in the art that many alternatives, modifications and variations in light of the foregoing description are possible. Accordingly, the present invention is intended to embrace all such alternatives, modifications and variations as may fall within the spirit and scope of the invention as disclosed.

Where the terms "comprise", "comprises", "comprised" or "comprising" are used in this specification (including the claims) they are to be interpreted as specifying the presence of the stated features, integers, steps or components, but not precluding the presence of one or more other features, integers, steps or components, or group thereof.

The claims defining the invention are as follows:

1. An apparatus for jump starting a vehicle having a battery and an alternator, comprising:
    a rechargeable power supply;
    an isolator electrically connected to said rechargeable power supply and configured for transitioning between a closed position to establish a low impedance electrical path between the rechargeable power supply and the alternator, via the vehicle battery, and an open position to close the electrical connection between the rechargeable power supply and the alternator;
    a cell voltage sensing and balancing circuit electrically connected to said a rechargeable power supply; and
    a controller electrically connected to said rechargeable power supply via said cell voltage sensing and balancing circuit, and electrically connected to said isolator, wherein the controller comprises a processor for processing digital data and a memory device coupled to the processor and configured for storing digital data including computer program code,
    wherein the processor is controlled by the computer program code to:
    (i) monitor a cell voltage in said rechargeable power supply via the cell voltage sensing and balancing circuit, and
        (a) if the cell voltage is less than a first predetermined threshold voltage, cause the isolator to transition to the closed position to charge said rechargeable power supply from the alternator,
        (b) if the cell voltage is greater than the first predetermined threshold voltage, cause the isolator to transition to the open position to close the electrical connection between said rechargeable power supply and the alternator; and
    (ii) when said rechargeable power supply has sufficient charge, cause the isolator to transition to the closed position to allow an electrical current to flow from said rechargeable power supply to the vehicle battery to jump start the vehicle via said low impedance electrical path.

2. An apparatus according to claim 1, wherein the rechargeable power supply comprises two or more lithium-based rechargeable cells connected in series, and wherein the processor is further controlled by the computer program code to:
    (i) determine, via the cell voltage sensing and balancing circuit, a cell voltage for each of the two or more lithium-based rechargeable cells to identify a lithium-based rechargeable cell having a minimum cell voltage ($V_{min}$) and a lithium-based rechargeable cell having a maximum cell voltage ($V_{max}$), wherein if:
        (a) the minimum cell voltage ($V_{min}$) is less than a second predetermined threshold voltage, or
        (b) the maximum cell voltage ($V_{max}$) is less than a third predetermined threshold voltage, or
        (c) the difference between the maximum cell voltage ($V_{max}$) and the minimum cell voltage ($V_{min}$) is less than a fourth predetermined threshold voltage, then
        A. transmit a signal to a resistor in the cell voltage sensing and balancing circuit to disconnect said resistor from the lithium-based rechargeable cell having the maximum cell voltage ($V_{max}$) to balance the cell voltage across the two or more lithium-based rechargeable cells;

or wherein if:
(a) the minimum cell voltage ($V_{min}$) is greater than the second predetermined threshold voltage, and
(b) the maximum cell voltage ($V_{max}$) is greater than the third predetermined threshold voltage, and
(c) the difference between the maximum cell voltage ($V_{max}$) and the minimum cell voltage ($V_{min}$) is greater than the fourth predetermined threshold voltage, then
A. transmit a signal to the resistor in the cell voltage sensing and balancing circuit to connect said resistor in parallel to the lithium-based rechargeable cell having the maximum cell voltage ($V_{max}$) to discharge said lithium-based rechargeable cell to balance the cell voltage across the two or more lithium-based rechargeable cells.

3. An apparatus according to claim 1, wherein the rechargeable power supply comprises at least one lithium-based rechargeable cell.

4. An apparatus according to claim 3, wherein the at least one lithium-based rechargeable cell is a lithium-iron phosphate cell selected from the group consisting of $LiFePO_4$, $LiFeMgPO_4$ and $LiFeYPO_4$.

5. An apparatus according to claim 1, wherein the rechargeable power supply comprises from one to four lithium-based rechargeable cells connected in series.

6. An apparatus according to claim 1, wherein the first predetermined threshold voltage is 14.6 V.

7. An apparatus according to claim 2, wherein the second predetermined threshold voltage is 2.5 V.

8. An apparatus according to claim 2, wherein the third predetermined threshold voltage is 3.4 V.

9. An apparatus according to claim 2, wherein the fourth predetermined threshold voltage is 0.2 V.

10. An apparatus according to claim 1, wherein the isolator comprises a solenoid.

11. An apparatus according to claim 1, further comprising a visual indicator electrically connected to the cell voltage sensing and balancing circuit, and configured to display a charge status of said rechargeable power supply.

12. An apparatus according to claim 1, further comprising a manual test switch electrically connected to the controller and configured to test a charge status of said rechargeable power supply when said manual test switch is activated.

13. An apparatus according to claim 1, further comprising a visual indicator electrically connected to the cell voltage sensing and balancing circuit and configured to display a power ON status of said apparatus.

14. An apparatus according to claim 1, further comprising a manual override switch electrically connected to the controller and configured to activate a manual override mode to enable a user to override a predetermined voltage threshold set for protection of the vehicle battery when said manual override switch is activated.

15. An apparatus according to claim 1, further comprising a switching circuit electrically connected to each of the controller and the rechargeable power supply and configured to enable the rechargeable power supply to be charged via an AC supply.

16. A system for jump starting a vehicle having a battery and an alternator, comprising:
an apparatus according to claim 1; and
a pair of jumpstart cables, each configured at respective ends thereof to electrically connect a corresponding one of a pair of terminals of the apparatus to a corresponding one of a pair of terminals of the vehicle battery so when the isolator is in the closed position, an electrical current is allowed to flow from said rechargeable power supply to the vehicle battery to jump start the vehicle via said low impedance electrical path.

17. A system according to claim 16, further comprising an AC charge unit configured for charging the rechargeable power supply via an AC supply.

* * * * *